United States Patent [19]
Ackerman et al.

[11] Patent Number: 5,191,314
[45] Date of Patent: Mar. 2, 1993

[54] COMBINATION ANTI-THEFT LOCK AND ALARM

[75] Inventors: Roger C. Ackerman, Laguna Niguel; Robert B. Jones, Laguna Hills; Kenneth A. Tarlow, Santa Monica; Eric Dennison, Laguna Hills, all of Calif.

[73] Assignee: Pacific West Industries, Beverly Hills, Calif.

[21] Appl. No.: 575,974

[22] Filed: Aug. 31, 1990

[51] Int. Cl.⁵ .................. E05B 45/06; E05B 19/14; G08B 13/14
[52] U.S. Cl. ...................... 340/542; 70/401; 340/521; 340/571; 340/693
[58] Field of Search ............. 340/542, 545, 568, 571, 340/687, 550, 521, 427, 693; 200/61.78, 250, 282, 290, 243; 70/432, DIG. 49, 408, 401; 109/41-44

[56] References Cited

U.S. PATENT DOCUMENTS

| | | | |
|---|---|---|---|
| 2,923,928 | 2/1960 | McLaughlin | 109/44 X |
| 3,781,861 | 12/1973 | Adler, Jr. et al. | 340/571 |
| 4,151,506 | 4/1979 | Schoenmetz | 340/427 |
| 4,211,995 | 7/1980 | Smith | 70/DIG. 49 X |
| 4,340,007 | 7/1982 | Hogan | 340/427 X |
| 4,556,765 | 12/1985 | Shaw et al. | 340/545 X |
| 4,603,563 | 8/1986 | Mochida et al. | 70/408 X |
| 4,663,611 | 5/1987 | Humphrey | 340/542 |
| 4,985,695 | 1/1991 | Wilkinson et al. | 340/571 |

Primary Examiner—Jin F. Ng
Assistant Examiner—Thomas J. Mullen, Jr.
Attorney, Agent, or Firm—Hawes & Fischer

[57] ABSTRACT

A portable combination anti-theft lock and alarm to prevent the theft or displacement of protected property and comprising a housing, an audible alarm and alarm circuit located within the housing, and a flexible electrically conductive locking cable having a first end that is fixedly attached to the housing and an opposite free end which is detachably connected to the housing. The alarm circuit is adapted to activate the alarm and cause a loud warning signal to be emitted through the housing in the event that either the cable or the housing is vandalized by a thief in an effort to gain access to the protected property. More particularly, the alarm will be activated if the cable is either severed or jumped by a shunt wire. The alarm will also be activated if the housing is cut or a battery cover plate is removed from the housing without properly operating an associated lock assembly.

20 Claims, 11 Drawing Sheets

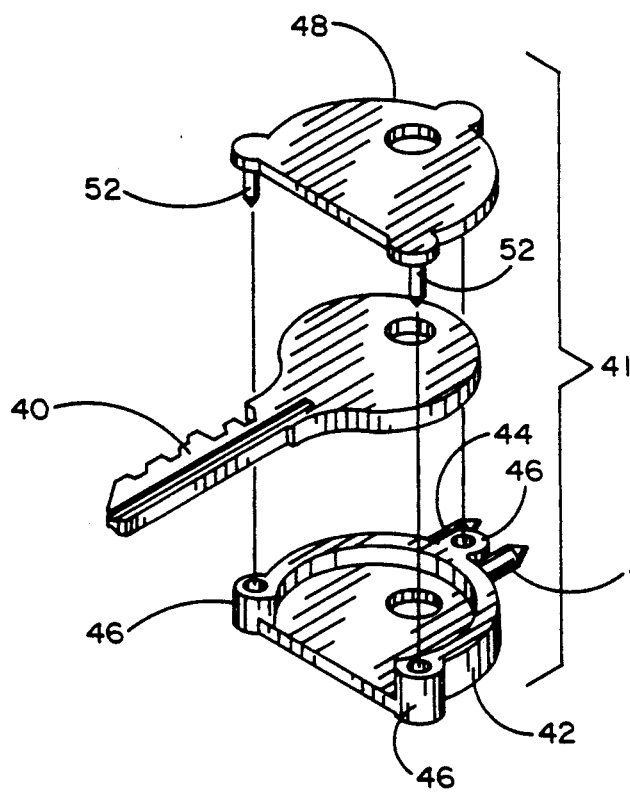
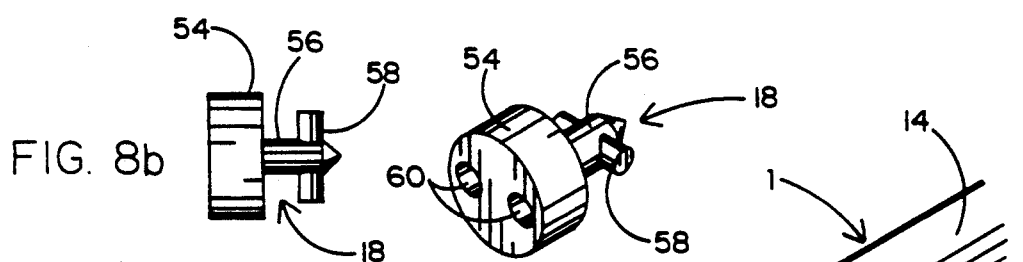
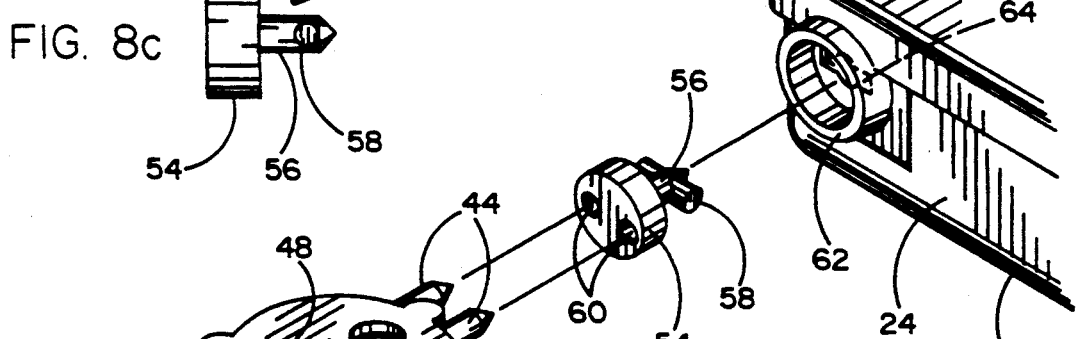
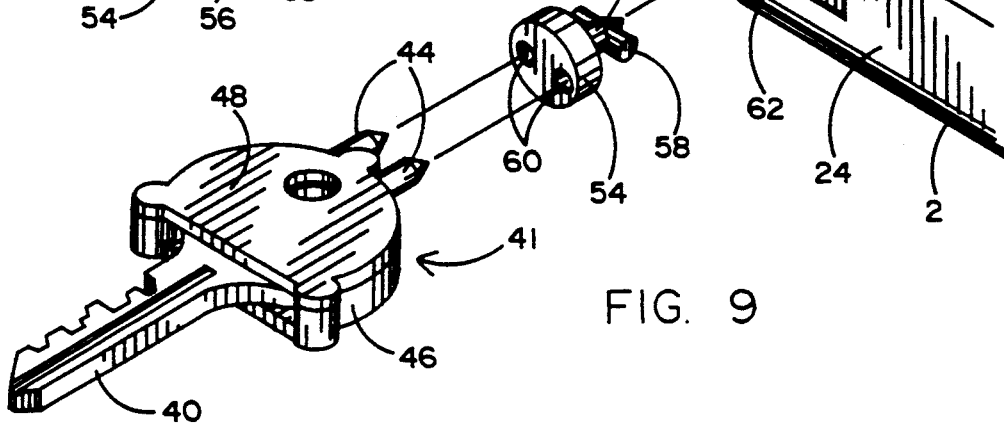

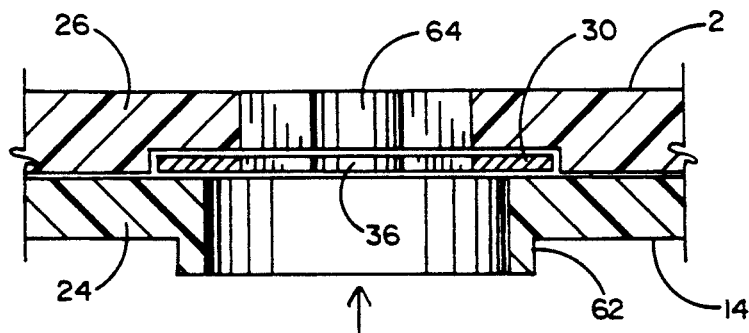
FIG. 10
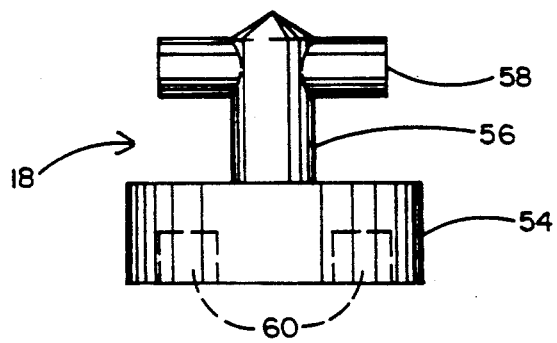
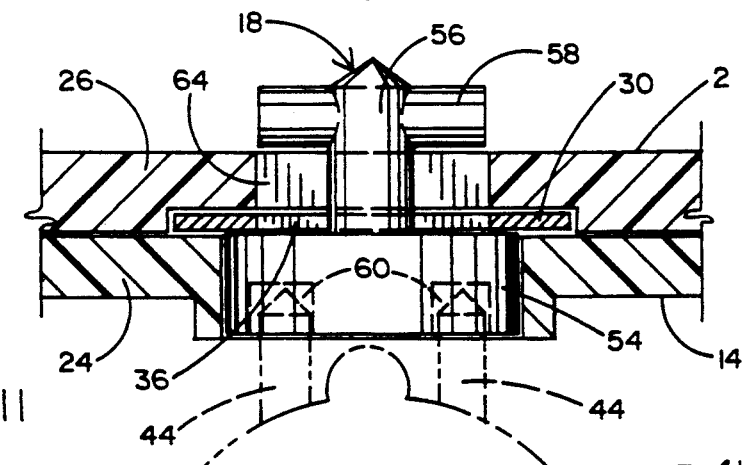
FIG. 11
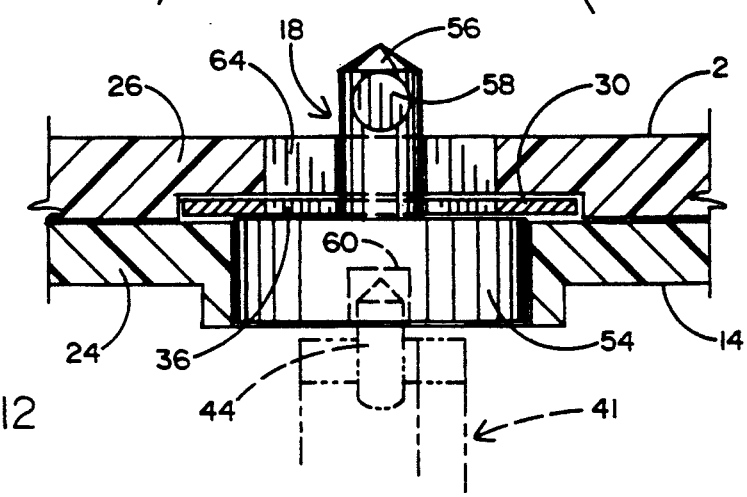
FIG. 12

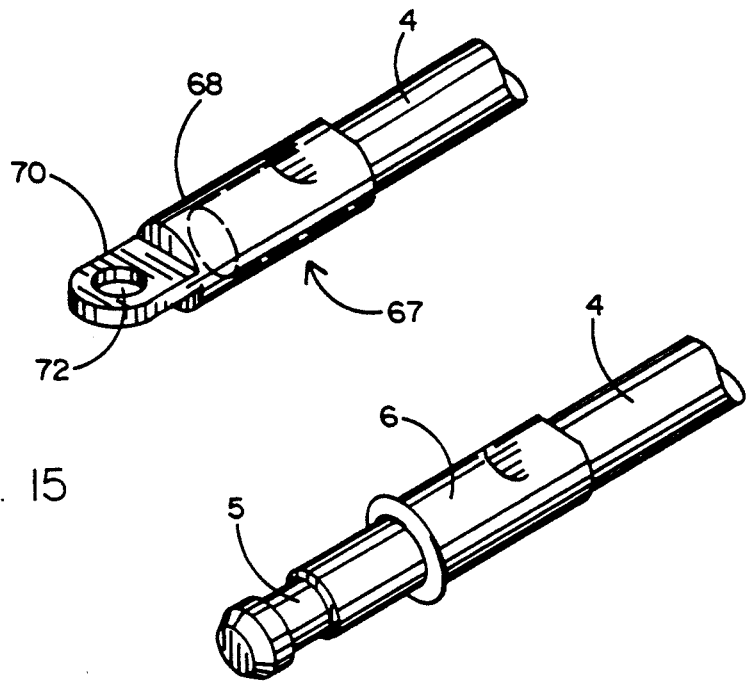
FIG. 15
FIG. 16
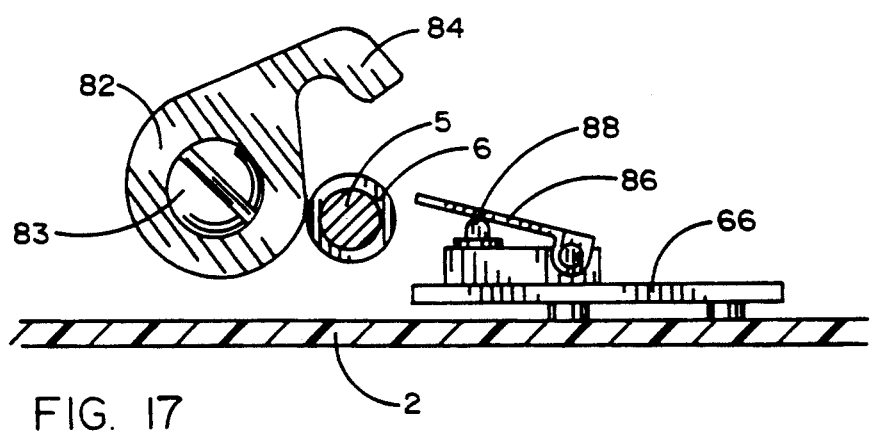
FIG. 17
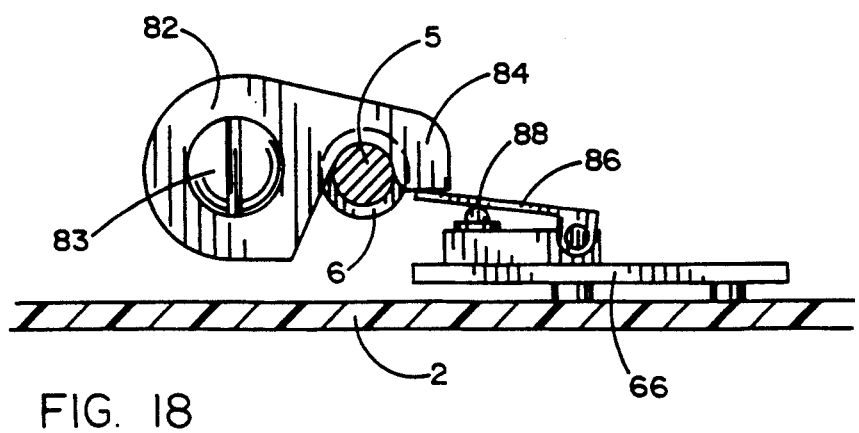
FIG. 18

COMBINATION ANTI-THEFT LOCK AND ALARM

BACKGROUND OF THE INVENTION

1. Field of the Invention

This invention relates to a reliable and portable combination lock and alarm having a flexible locking cable and alarm circuit by which to reduce the chance of theft and unauthorized displacement of protected property by causing an audible alarm signal to be sounded in the event that the cable is severed or the lock vandalized.

2. Background Art

Lock and alarm systems are known by which to prevent the theft and unauthorized use or displacement of valuable property, such as a bicycle, motorcycle, suitcase, and the like. Such conventional lock and alarm systems are also known to include a flexible cable having a fixed end connected to the lock and a free end surrounding an immovable object (e.g. a tree or a post) and detachably connected to the lock. In the event that the cable is cut in an effort to remove the protected property, an audible alarm is sounded to warn the property owner of an impending theft. Examples of known lock and alarm systems which include a locking cable to prevent the theft of protected property are available by referring to one or more of the following U.S. Pat. Nos.:

3,755,778, Aug. 28, 1973
3,772,645, Nov. 13, 1973
3,781,861, Dec. 25, 1973
3,824,540, July 16, 1974
3,824,541, July 16, 1974
3,914,756, Oct. 21, 1975
4,006,452, Feb. 1, 1977
4,057,986, Nov. 15, 1977
4,151,506, Apr. 24, 1979
4,340,007, July 20, 1982
4,663,611, May 5, 1987
4,776,188, Oct. 11, 1988

However, the above-identified systems have inherent limitations which might permit a thief to disable the lock and/or alarm and remove the protected property without sounding an alarm signal. That is to say, while some systems activate the alarm in the event that the locking cable is cut, it is still possible to jump the cable with a shunt wire in an effort to mask the fact that the locking cable has been severed. Moreover, the lock housing may be vandalized or cut in an effort to gain access to and remove the battery or disarm the alarm circuit. In either event, the known lock and alarm systems may be relatively easily overcome with the consequence of having one's valuable property stolen.

It would therefor be desirable to have available a more reliable combination lock and alarm system which would reduce the chance of theft of protected property by sounding an alarm warning signal should either the locking cable or the lock housing be cut or vandalized.

SUMMARY OF THE INVENTION

In general terms, a reliable anti-theft combination lock and alarm is disclosed by which to emit an audible alarm signal to warn an owner of the impending theft or unauthorized displacement of his protected property. The lock and alarm of the present invention is of the type including a flexible electrically conductive locking cable having a fixed end attached to the alarm housing and an opposite free end which extends around an immovable object. In one embodiment of the invention, the alarm housing is secured to the property (e.g. a bicycle, or the like) to be protected. The free end of the cable is removably connected to the alarm housing by operating a first lock assembly which simultaneously captures the cable within the housing and connects the alarm circuit to a power (i.e. battery) source, whereby to energize the circuit and arm the system. The alarm housing has a cover plate which is removable in order to gain access to the power source and the alarm circuit. The cover plate is attached to or removed from the alarm housing by operating a second lock assembly. A pair of electrically conductive spring-like strips lie below the cover plate and are moved into contact with one another to complete an electrical current path whenever said cover plate is properly attached to the alarm housing.

The alarm circuit includes a series circuit that is connected between the power source and the alarm and comprises the interconnection of the electrically conductive locking cable, the current path between the electrically conductive strips, and an electrically conductive wire which extends around the periphery of the alarm housing. A loud warning signal will be emitted by the alarm in the event that the alarm circuit is energized and the locking cable is severed, or the cover plate is removed from the housing to cause the conductive strips thereunder to separate from one another, or the conductive wire extending around the alarm housing is cut should said housing be broken or damaged by a thief seeking unauthorized entry thereto. What is more, the alarm circuit also includes impedance responsive means which will cause the warning signal to be sounded by the alarm in the event the locking cable is jumped by a shunt wire whereby to cause the impedance of the cable to fall outside a predetermined impedance level.

BRIEF DESCRIPTION OF THE DRAWINGS

FIGS. 7-12 show lock and key means by which the battery cover plate is detachably connected to the housing of the combination lock and alarm;

FIGS. 15 and 16 illustrate opposite fixed and free ends, respectively, of a locking cable which is interconnected with the housing of the combination lock and alarm;

FIGS. 17 and 18 show a locking cam that is rotated within the housing of the combination lock and alarm to simultaneously capture the free end of the locking cable of FIG. 16 and close a microswitch to connect the alarm circuit to a voltage source;

DESCRIPTION OF THE PREFERRED EMBODIMENT

Figure 1:
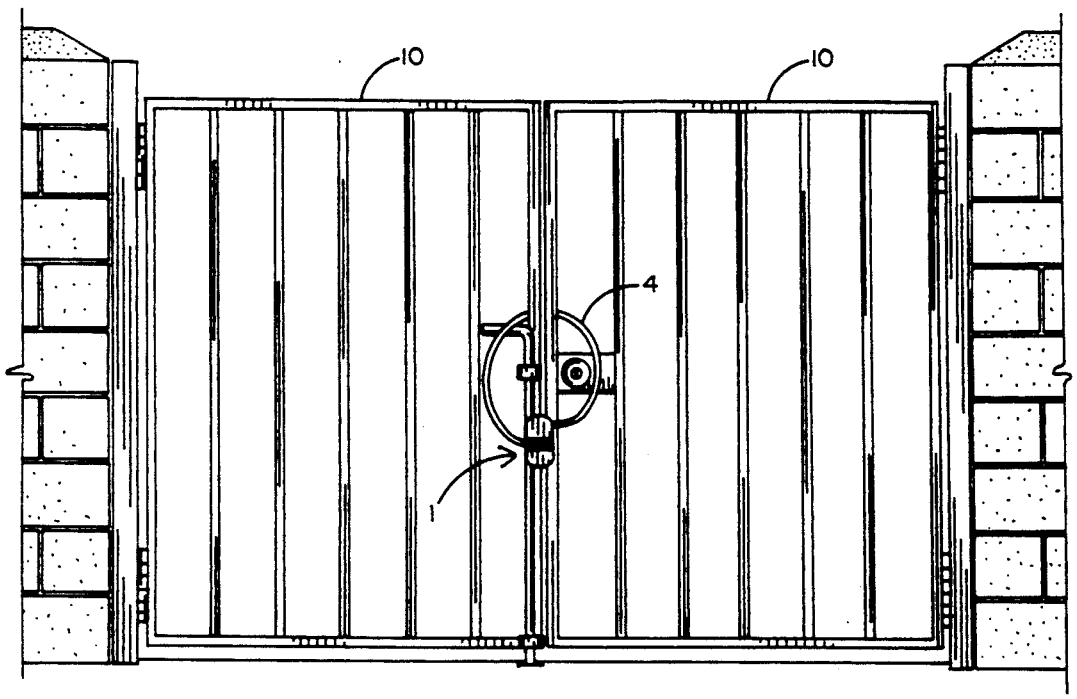
FIG. 1 shows the combination lock and alarm according to a first embodiment of the present invention associated with a gate, the unauthorized opening of which is to be prevented.
Figure 2:
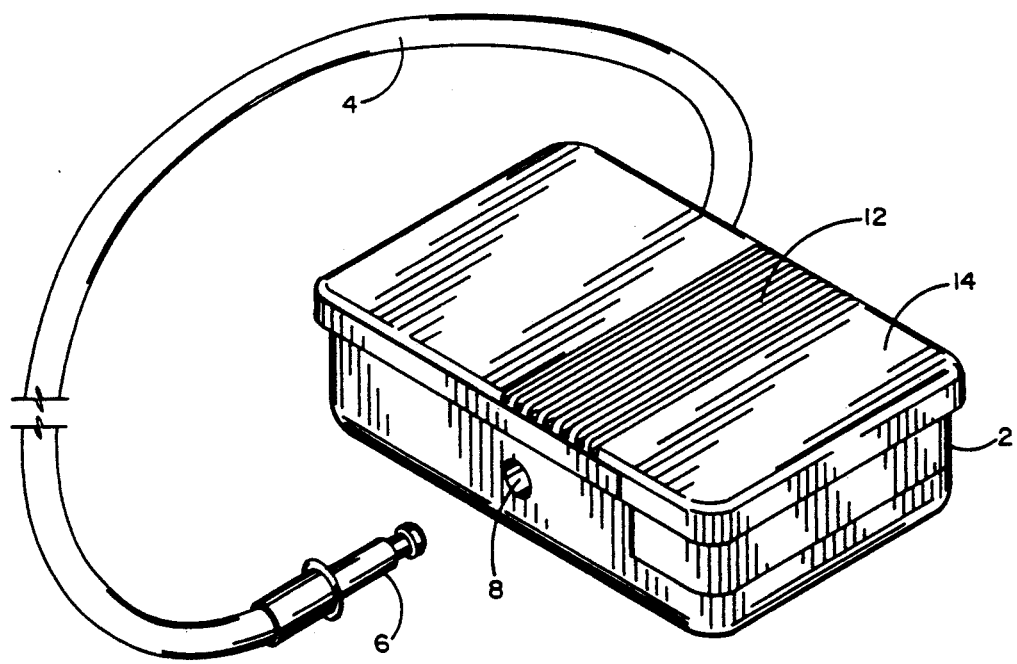
FIGS. 2 and 3 are enlarged perspective views of the combination lock and alarm of FIG. 1.

The combination anti-theft lock and alarm 1 which forms the present invention is described in detail while referring initially to FIGS. 1 and 2 of the drawings. Lock/alarm 1 includes a relatively lightweight, shock resistant housing 2 that is preferably manufactured from plastic, or the like. One end of an electrically conductive locking cable 4 is fixedly attached to the housing 2 while the opposite free end of cable 4 is detachably connected to said housing. The cable 4 is preferably, but not necessarily limited to, a 3/16 inch multi-stranded steel cable that is surrounded by an insulating rubber shield. A conventional jack 6 is connected to the free end of cable 4 to be received within an inlet opening 8 of housing 2. As will be explained in greater detail, the receipt of jack 6 in opening 8 permits the free end of cable 4 to be captured and secured within housing 2 to thereby complete an electrical current path through said cable.

In the embodiment of the invention illustrated in FIG. 1, the locking cable is wrapped around property that is to be protected against displacement or unauthorized handling. By way of example, only, the cable 4 is wrapped around the bars of adjacent sections 10 of an entry gate to prevent the gate from being opened against the will of the property owner. However, and as will also be explained in greater detail, should the locking cable 4 be cut or the housing 2 damaged in an effort to avoid the protection afforded by the cable 4 of lock/alarm 1, an audible alarm signal will be sounded from within housing 2 to warn the property owner of an impending invasion to his property. To this end, a series of slitted openings 12 are formed through a top cover plate 14 of the housing 2 of lock/alarm 1 so that the sound generated by the alarm will not be muted.

Figure 3:
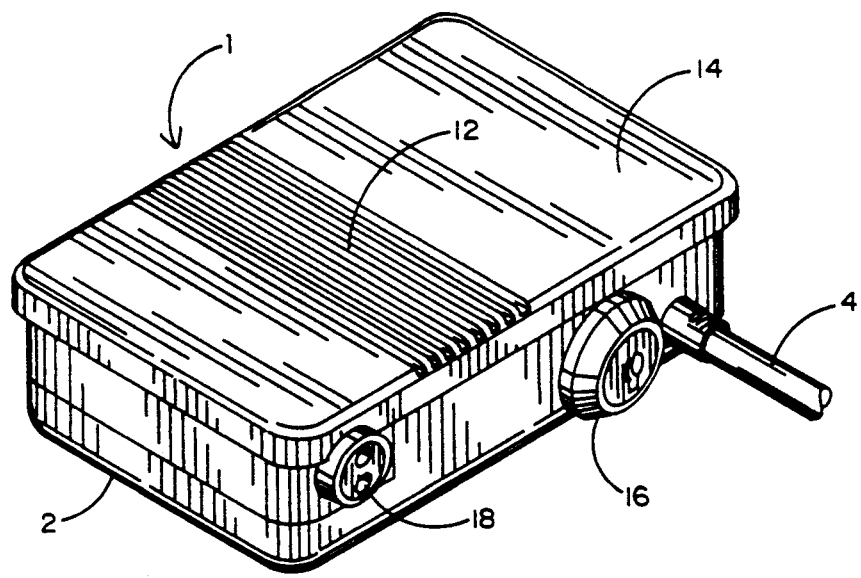

FIG. 3 of the drawings shows the combination lock and alarm 1 and a pair of lock assemblies 16 and 18 that are carried by the housing 2. More particularly, a first lock assembly 16 extends through the housing 2 of lock/alarm 1. Lock assembly 16 is operated by a conventional key (designated 40 in FIG. 7) in order to simultaneously and selectively energize or de-energize the alarm circuit of lock/alarm 1 and capture or release the free end of locking cable 4 within housing 2. A second lock assembly 18 is carried by cover plate 14 in order to attach or release said cover plate to or from the housing 2.

Figure 4:
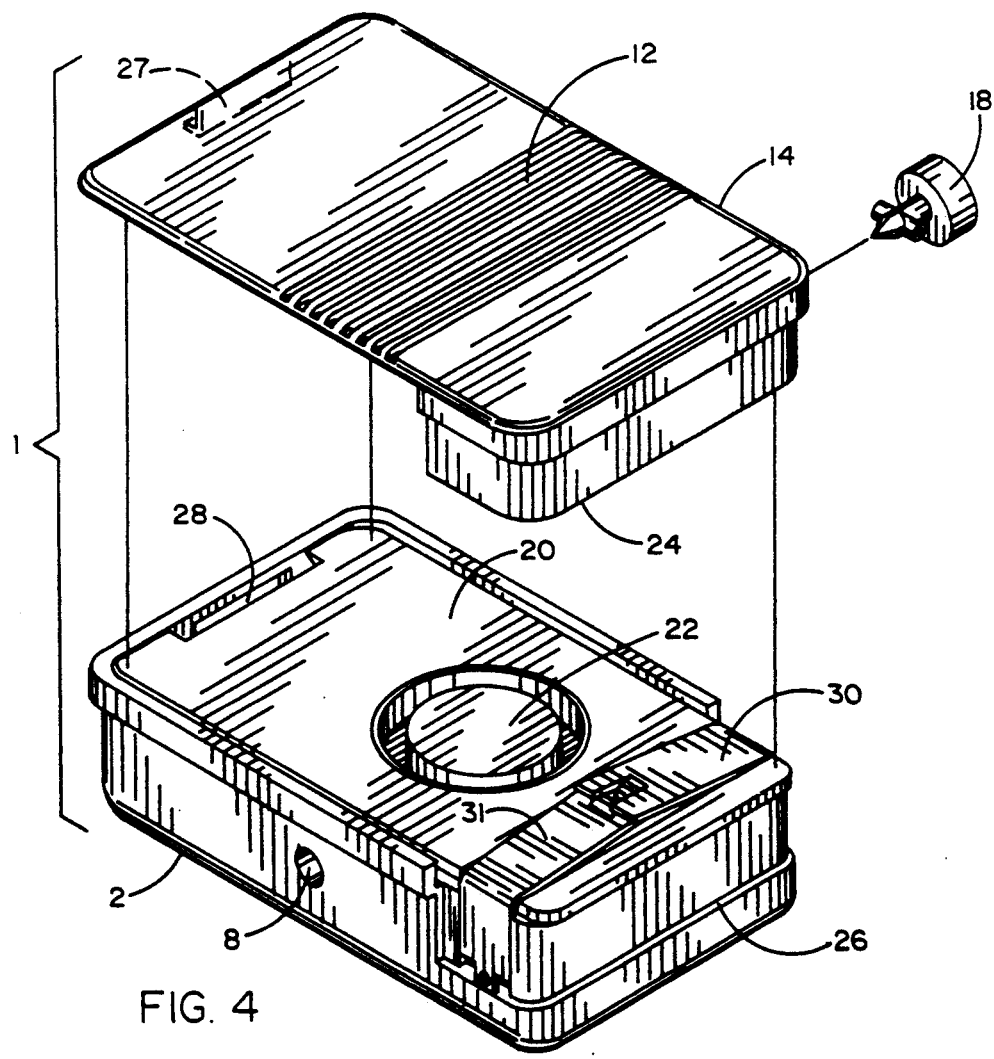
FIGS. 4 and 5 are exploded views of the combination lock and alarm.

That is, and referring to FIG. 4 of the drawings, the top cover plate 14 of lock/alarm 1 is shown being detachable from housing 2 when it is desirable to gain access to either the alarm circuit or the battery thereof (designated 50 in FIG. 5) or a buzzer plate 20 which underlies cover plate 14 to support horn 22 that will emit a loud warning signal through the openings 12 in cover plate 14 in the event that the cable is cut or the housing damaged. By way of example, the horn 22 amplifies sound that is provided thereto from a piezo electric transducer (not shown) so that approximately 110 decibels of high frequency sound will be emitted until the warning signal times out. As will be described in greater detail when referring to FIGS. 7-9, lock assembly 18, which locks cover plate 14 to housing 2, is operated by means of a special tool (designated 41 in FIG. 7) that is adapted to snap on to the same key 40 that operates lock assembly 16. Thus, and unlike other known lock and alarm devices, access to the battery 50, which energizes the alarm circuit of lock/alarm 1 and which drives the piezo electric transducer of horn 22, is guarded by the removable top cover plate 14 and its associated lock assembly 18.

To effect the detachable and lockable connection of top cover plate 14 to the housing 2 of lock/alarm 1, a locking flange 24 projects from cover plate 14 and extends around the periphery at one end thereof. Projecting outwardly from the opposite end of cover plate 14 is a relatively short tongue 27. In the assembled relationship, the tongue 27 is pivotally received within a notch 28 that is formed in housing 2, whereby the cover plate 14 can be rotated downwardly over buzzer plate 20, so that the locking flange 24 of cover plate 14 will be moved into contact with and mated to the housing 2 at a recessed area 26 thereof. Lock assembly 18 is located at the locking flange 24 of cover plate 14 and, as is best illustrated in FIGS. 10-12, extends into the interior of housing 2 through an opening formed in the recessed area 26 of said housing. Hence, by use of the aforementioned locking tool 41, the lock assembly 18 may be operated (i.e. rotated) to a suitable position at which the top cover plate 14 is either attached to or detached from housing 2 atop buzzer plate 20 and horn 22.

Referring concurrently to FIGS. 4, 5, 6a and 6b, means are illustrated by which to cause a warning signal to be emitted from the horn 22 in the event that the top cover plate 14 is detached from housing 2 in an unauthorized manner and without the proper operation of lock assembly 18 in an effort to disable the alarm circuit or remove the battery 50. More particularly, a pair of relatively thin, flexible and electrically conductive strips 30 and 31 are connected into the alarm circuit (best shown in FIG. 20) of the combination lock and alarm 1. Strips 30 and 31 are manufactured from a metallic (e.g. brass) material and possess a spring-like resiliency. In the assembled relationship, the strips 30 and 31 are received within and supported at a recessed area 32 of the buzzer plate 20. Each conductive strip 30 and 31 has a respective contact or tab 34 projecting downwardly therefrom. Moreover, one of the strips (e.g. 30) has a hole 36 (best shown in FIG. 5) by which to accommodate the lock assembly 18 through the locking flange 24 of top cover plate 14.

Also, in the assembled relationship, the conductive strips 30 and 31 extend laterally across buzzer plate 20 below the cover plate 14 of lock/alarm 1. A slot 38 is formed through the recess 32 of buzzer plate 20 to receive the tab 34 of at least one of the strips (e.g. 31) and thereby assure that suitable electrical contact is established between said strips 30 and 31. Because of the spring-like resiliency thereof, conductive strips 30 and 31 are normally biased (with the top cover plate 14 of lock/alarm 1 removed from housing 2) so as to rotate out of the slot 38 in the buzzer plate 20, whereby the strips are separated from one another and the electrical contact therebetween is broken (best shown in FIG. 6a). When the cover plate 14 of lock/alarm 1 is properly connected to housing 2 atop buzzer plate 20, the strips 30 and 31 will be rotated by cover plate 14 against their normal spring bias towards buzzer plate 20, such that the tabs 34 of strips 30 and 31 are received at the slot 38 and an electrical current path is established between said strips (best shown in FIG. 6b).

Accordingly, any time that the cover plate 14 is removed from the housing 2 of lock/alarm 1, the electrically conductive strips 30 and 31 will, by virtue of their normal spring bias, rotate away from buzzer plate 20 and out of contact with one another, whereby to break the electrical current path that was previously established therebetween. As will be described when referring to FIG. 20, such an interruption in the current path between strips 30 and 31 will cause the horn 22 to emit a warning signal whenever the alarm circuit is energized and the cover plate 14 is removed from housing 2 without proper operation of lock assembly 18. Thus, it may be appreciated that the unauthorized removal of top cover plate 14 from housing 2 in an effort to disable and defeat the alarm circuit of the combination lock and alarm 1 will result in a warning signal being produced to alert a user to a possible intrusion into the housing 2 of the said lock/alarm.

Referring now to FIG. 7 of the drawings, details are provided of the means by which to operate the pair of lock assemblies 16 and 18 (of FIG. 3) of combination lock and alarm 1 by which to cause the free end of cable 4 to be captured, the alarm circuit to be energized, and the cover plate 14 to be secured to the top of housing 2. More particularly, the lock assemblies 16 and 18 are controlled by a conventional key 40. The narrow tail of key 40 is sized and cut, in the usual fashion, to be received within and rotate lock assembly 16 from a locked to an unlocked position. The opposite, relatively wide head of key 40 is interfaced with a locking tool 41 that is adapted to operate lock assembly 18.

The aforementioned locking tool 41 includes a hollow, flat and circular base 42 which is sized to receive therewithin the head of key 40. A pair of fingers 44 project outwardly and in parallel alignment from base 42. The use of fingers 44 for operating lock assembly 18 will soon be described. A plurality of (e.g. three) receptacles 46 are coextensively formed with and evenly spaced around the periphery of base 42. The locking tool 41 also includes a flat, circular cover 48 which has a size and configuration to conform to and be received atop the hollow base 42. Cover 48 has a plurality of (e.g. three) prongs 52 which project downwardly therefrom and are aligned with the receptacles 46 of base 42. Accordingly, in the assembled relationship of locking tool 41 (best shown in FIG. 9), and after the head of key 40 is placed within the hollow base 42, the prongs 52 of cover 48 are snap-fit within respective receptacles 46 of base 42, whereby cover 48 is detachably connected to base 46, with the head of key 40 being retained therebetween. The locking tool 41 is removable from key 40 by simply detaching or unsnapping cover 48 from base 42. However, and as will now be explained, by attaching locking tool 41 to key 40, a single readily available key may be easily modified and used to control the operation of both locking assemblies 16 and 18 of lock/alarm 1.

As is best shown in FIG. 8, lock assembly 18 is preferably of the type known as a bayonet fastener and includes a cylindrical body 54, a stem 56 extending from body 54, and a crossbar 58 supported by and extending perpendicularly through stem 56. A pair of sockets 60 are formed in the body 54 of lock assembly 18 to receive therewithin the respective fingers 44 which project from locking tool 41.

Figure 5:
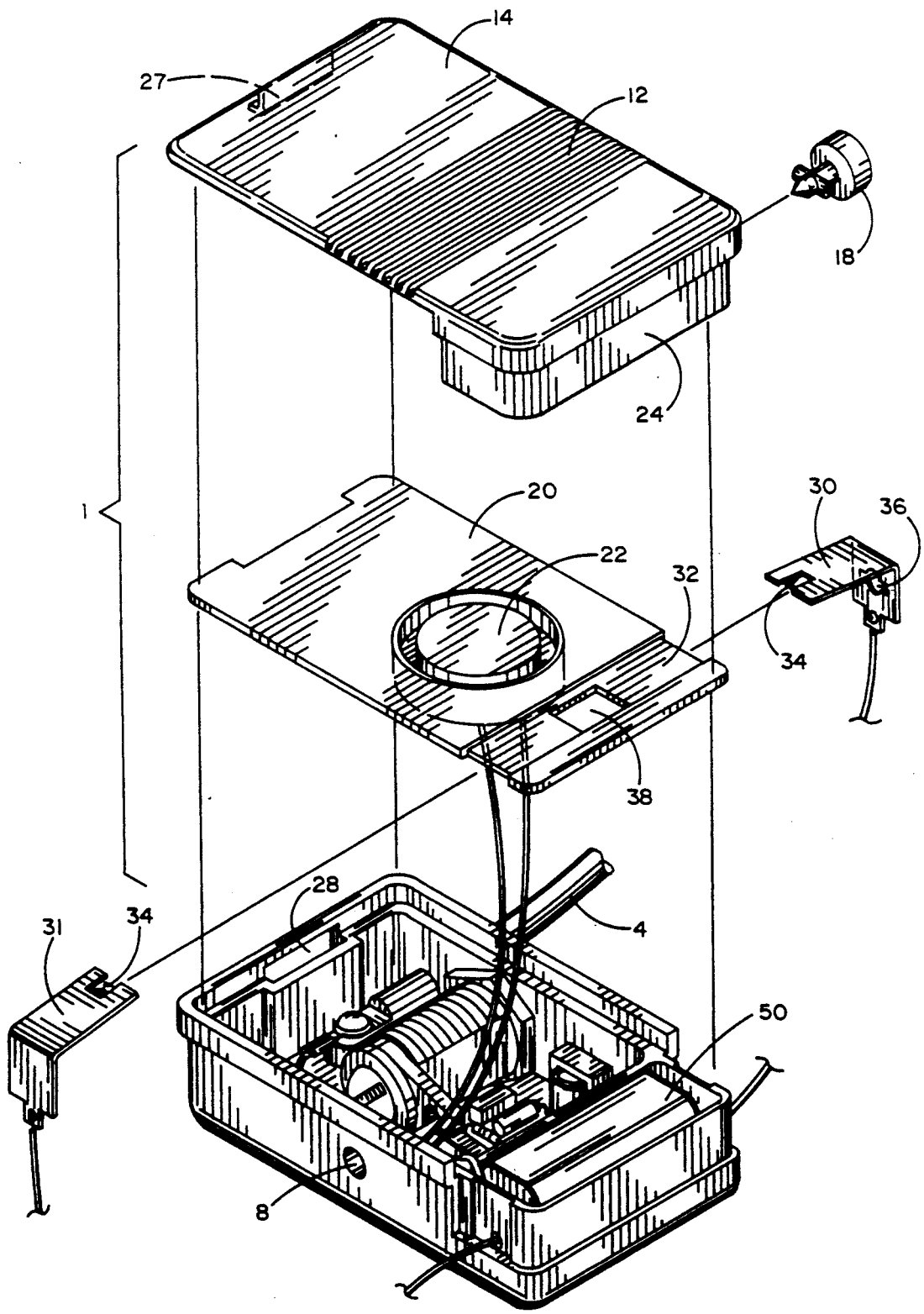
Figure 6A:
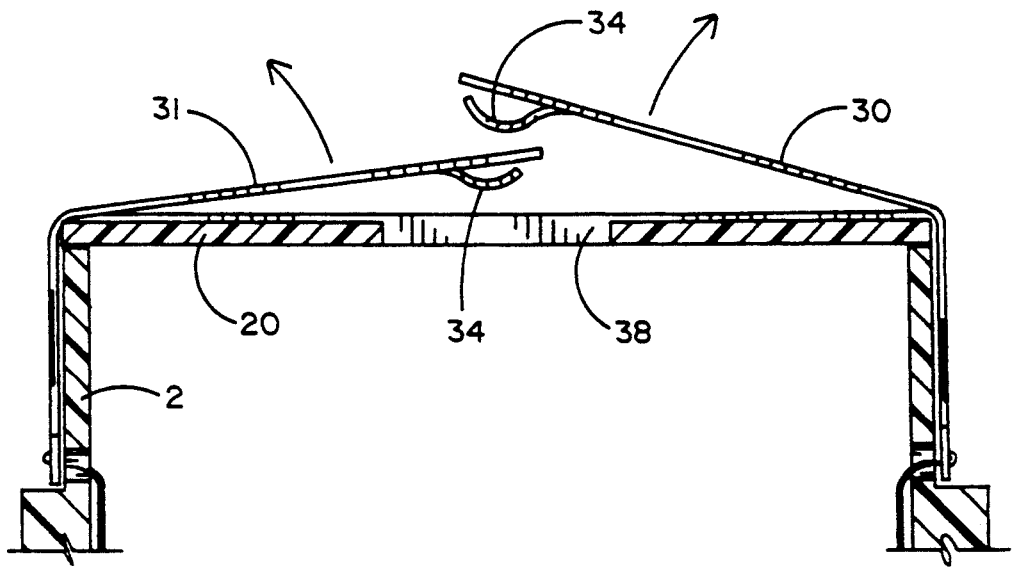
FIGS. 6a and 6b illustrate spring-like conductive strips that are associated with a battery cover plate which is detachably connected to the housing of the combination lock and alarm.
Figure 6B:
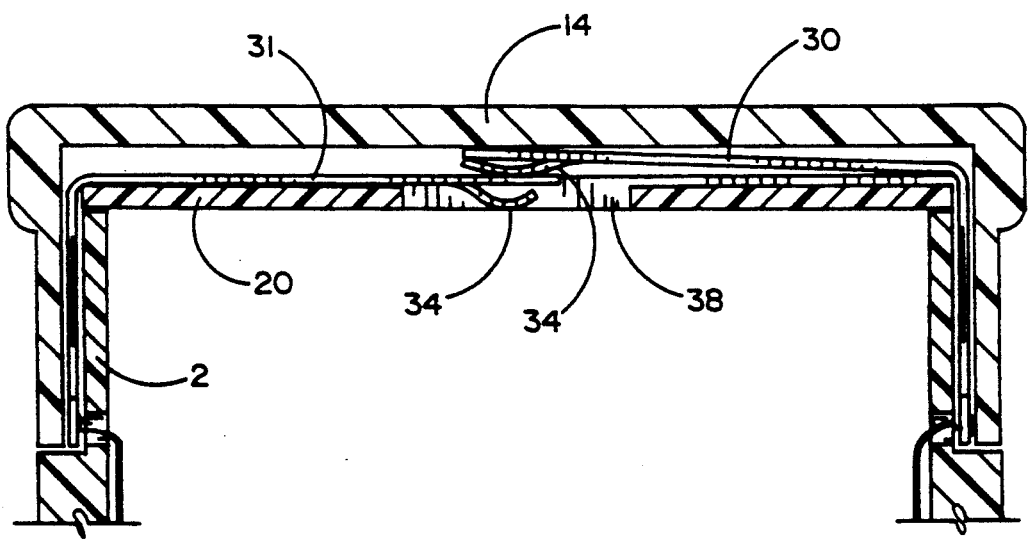

The use of locking tool 41 to operate lock assembly 18 and thereby permit the top cover plate 14 to be detachably connected to the housing 2 of combination lock and alarm 1 is now described while now referring concurrently to FIGS. 9–12 of the drawings, where lock assembly 18 is shown being carried at the locking flange 24 of top cover plate 14. A cylindrical bore 62 extends outwardly from locking flange 24 in surrounding engagement with lock assembly 18. As was previously described when referring to FIG. 4, the top cover plate 14 is closed against the housing 2 of lock/alarm 1, such that the locking flange 24 of cover plate 14 is moved into contact with and mated to the recessed area 26 of housing 2. The recessed area 26 of housing 2 is provided with a generally rectangular opening 64 which is shaped to accommodate the stem 56 and crossbar 58 of lock assembly 18. A similarly shaped opening, designated 36 in FIG. 5, is formed through one of the conductive strips 30 that is received below cover plate 14. Accordingly, and in the assembled relationship of FIG. 10, the respective openings 36 and 64 of strip 30 and recessed area 26 are aligned with one another to receive the stem 56 and crossbar 58 of lock assembly 18 therethrough, such that crossbar 58 is located at the interior of housing 2.

After the locking tool 41 has been attached to the head of key 40 in the manner previously disclosed when referring to FIG. 7 and the fingers 44 of tool 41 are located in the sockets 60 of lock body 54, a 90 degree clockwise rotation (i.e. a quarter turn) which is imparted to the key 40 is transferred by tool 41 to the body 54 of lock assembly 18, whereby to cause a corresponding rotation of the crossbar 58 thereof from the unlocked position shown in FIG. 11 to the locked position shown in FIG. 12. That is to say, a rotation of lock assembly 18 to the locked position of FIG. 12 and a removal of the fingers 44 of locking tool 41 from the sockets 60 will result in the crossbar 58 of assembly 18 being moved out of alignment with opening 36 and 64 and the top cover plate 14 being locked to the housing 2 so that unauthorized access to the battery and alarm circuit at the interior of said housing will be denied. Of course, by once again inserting locking tool 41 within sockets 60 and rotating lock assembly 18 a quarter turn in the counterclockwise direction to the unlocked position of FIG. 11, the crossbar 58 of lock assembly 18 will be aligned to be withdrawn from openings 36 and 64 such that cover plate 14 can now be unlocked and detached from housing 2 so that the battery can be changed or repairs made to the alarm circuit.

Figure 13:
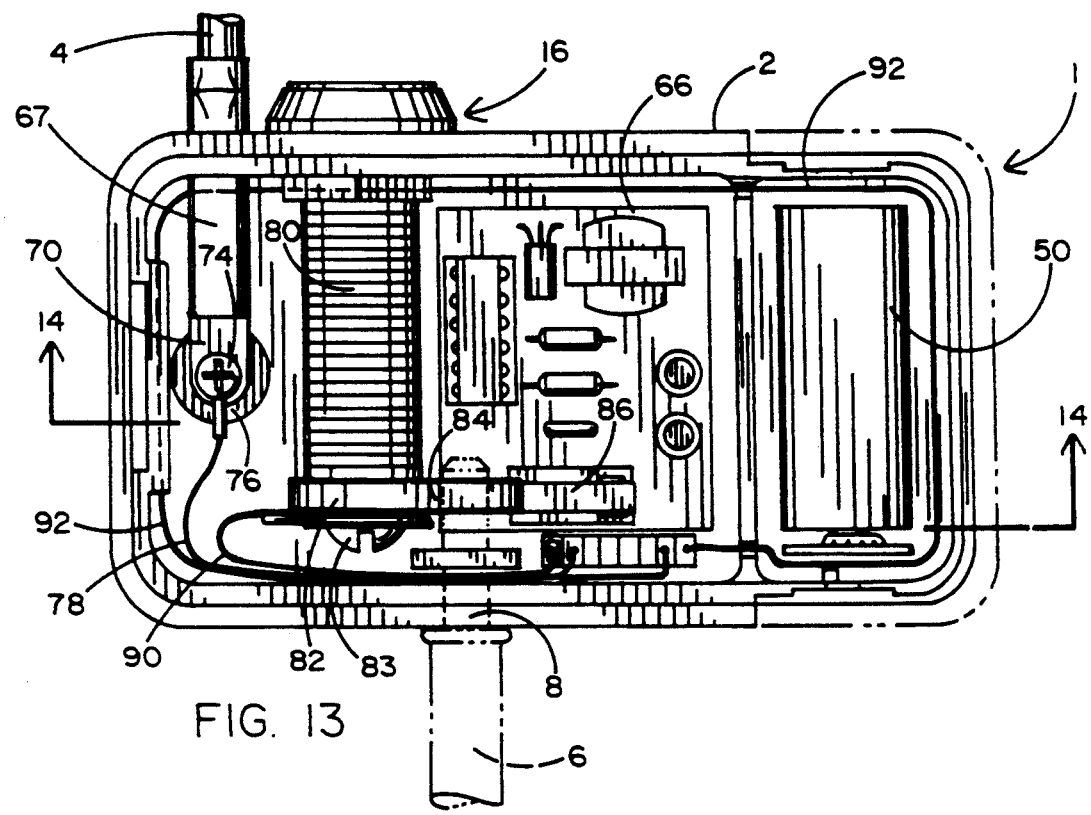
FIG. 13 shows a top view of the housing of the combination lock and alarm with the battery cover plate and a buzzer plate removed therefrom.
Figure 14:
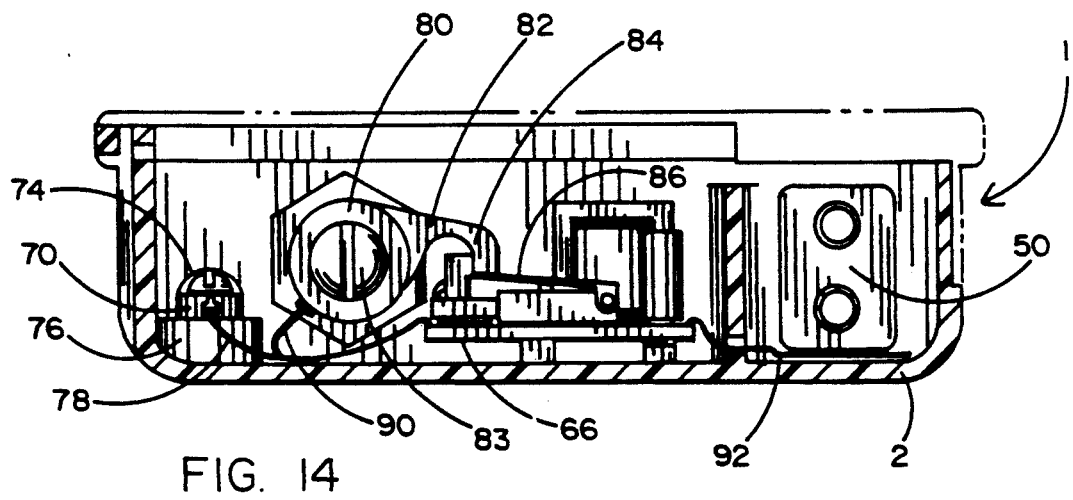
FIG. 14 is a cross-section taken along lines 14—14 of FIG. 13.

Referring concurrently to FIGS. 13–15 of the drawings, one end of the electrically conductive locking cable 4 is shown fixedly connected to the housing 2 of combination lock/alarm 1. More particularly, and as is best shown in FIG. 15, one end of the cable 4 is received within a sleeve 68 that forms one end of an electrical connector 67. The sleeve 68 is crimped to secure the cable 4 to connector 67. At the opposite end of connector 67 is a lug 70 having a hole 72 formed therein. In the assembled relationship of FIGS. 13 and 14, the lug 70 of connector 67 is attached to the housing 2 by means of inserting a conventional fastener 74 through the hole 72 in lug 70 and into a boss 76 which projects upwardly from the housing. One end of a wire 78 is connected to the fixed end of cable 4 at the lug 70 of connector 67. The opposite end of wire 78 is connected to the alarm circuit to establish a current path to cable 4. The alarm circuit is preferably surface mounted on a printed circuit board 66 that is supported above the floor of housing 2.

As was previously described, and as is best shown in FIG. 16, the opposite, free end of locking cable 4 is secured (i.e. crimped) to the jack 6 which is to be inserted into the housing 2 of lock/alarm 1 via inlet opening 8. The jack 6 includes a relatively narrow neck area 5, the purpose of which will soon be disclosed.

Referring now to FIGS. 13, 14 and 16–18, the use of the key 40 (of FIGS. 7 and 9) is described to operate the lock assembly 16 in order to capture the jack 6 at the free end of locking cable 4 and simultaneously energize the alarm circuit by connecting circuit board 66 to the battery 50. Lock assembly 16 includes a locking cylinder 80 that extends laterally through the housing 2 of lock/alarm 1. The insertion and rotation of key 40 in one end of lock assembly 16 causes a corresponding rotation of locking cylinder 80. Such a lock assembly 16 is commercially available as Model No. 1704-6T from Chicago Lock Company. An electrically conductive locking cam 82 having a coextensive catch 84 is affixed to the opposite end of locking cylinder 80 by a suitable fastener 83 so that cam 82 is rotatable with cylinder 80 at the interior of housing 2.

Prior to the rotation of the key 40 in lock assembly 16 when the jack 6 is first inserted into the housing 2 of lock/alarm 1, the locking cam 82 is disengaged from jack 6 (best illustrated in FIG. 17). Moreover, a pivotable switch arm 86 is positioned above and out of contact with a normally open microswitch 88 that is located at the circuit board 66 to be connected between the alarm circuit and battery 50. A rotation of key 40 in lock assembly 16 is transferred to locking cylinder 80, whereby to cause a corresponding rotation of the locking cam 82 into engagement with the jack 6 of cable 4 best illustrated in FIG. 18). That is, the catch 84 of locking cam 82 is received at the relatively narrow neck 5 of jack 6 so as to capture said jack and prevent the withdrawal of cable 4 from housing 2 without a counterrotation of the key 40 in lock assembly 16 and a corresponding disengagement of the catch 84 from the jack. What is more, a current path is established between circuit board 66 and the jack 6 of locking cable 4 by way of a wire 90 that is connected from said circuit board to the electrically conductive locking cam 82. Thus, it may be appreciated that, by virtue of wires 78 and 90, a continuous electrical path is completed from the circuit board 66 through the locking cable 4 so that a current may be passed through said cable for the purpose of indicating a cutting or breaking of such cable when a thief is seeking access to the property protected by lock/alarm 1.

At the same time that the jack 6 is captured by locking cam 82, the catch 84 thereof is rotated into contact with the switch arm 86 that is disposed above microswitch 88. Accordingly, switch arm 86 is pivoted downwardly to depress (i.e. close) microswitch 88 and thereby connect the alarm circuit at the circuit board 66 to the battery 50, whereby the circuit is armed (represented schematically in FIG. 19). That is, the lock/alarm 1 is now responsive to tampering with or vandalizing the locking cable 4 and/or the housing 2 in an effort to defeat the anti-theft features of the present invention.

To increase the reliability of the combination lock and alarm 1 against the possibility that a thief might attempt to break into the housing 2 to either remove battery 50 or disarm the alarm circuit, an intrusion wire 92 (best shown in FIGS. 13 and 14) is strategically positioned around the periphery of housing 2. Opposite ends of the intrusion wire 92 are connected to circuit board 66 so that the alarm circuit will be responsive to the resistance (i.e. continuity) of wire 92. That is, and as will be described next when referring to the details of the alarm circuit of FIGS. 19 and 20, a warning signal will be emitted in the event that intrusion wire 92 is cut by a thief who attempts to invade the housing 2 of lock/alarm 1 by means of an ax, saw, or the like.

Figures 19, 20:
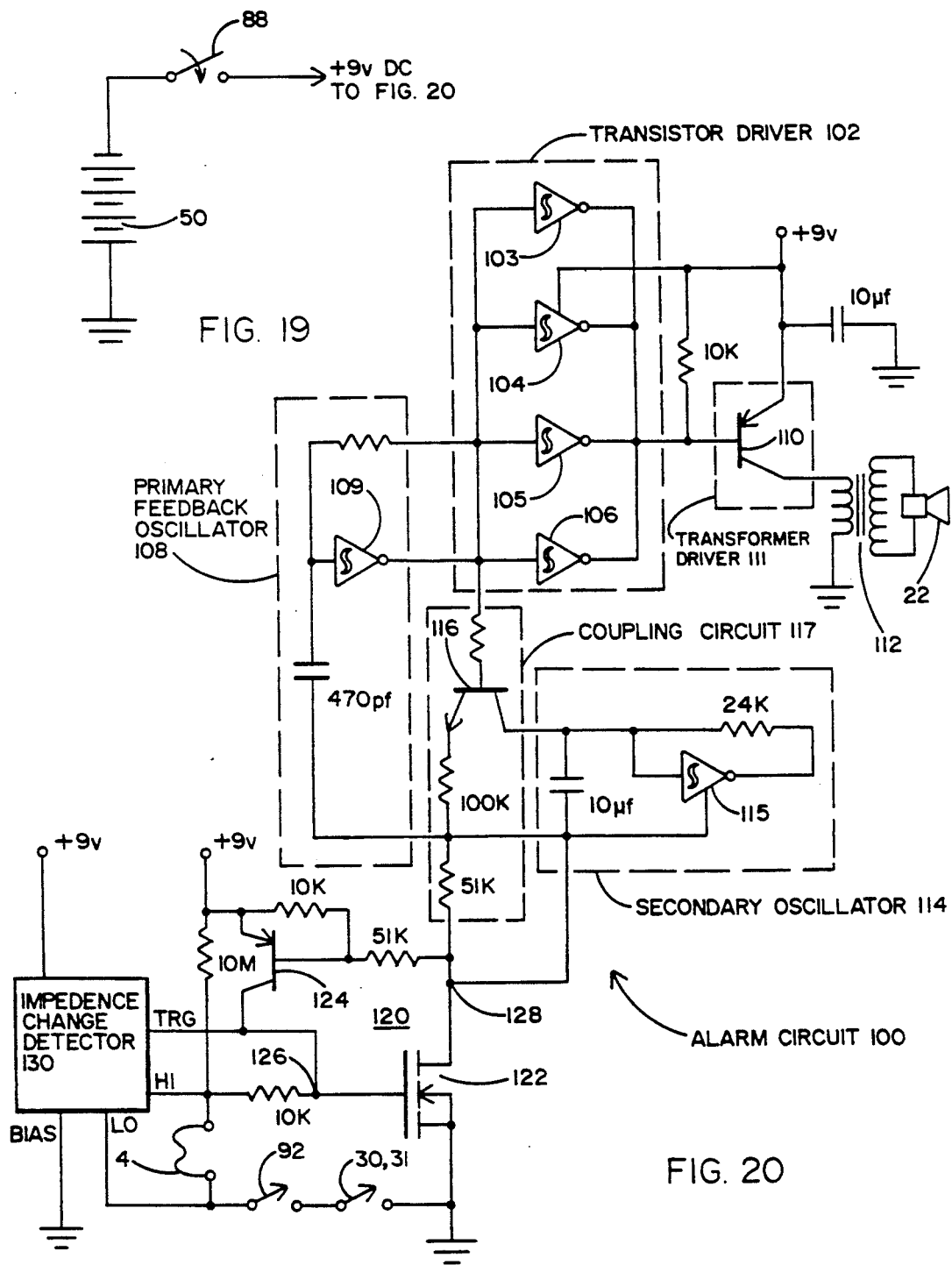
FIGS. 19 and 20 represent schematics of the alarm circuit of the combination lock and alarm.

FIGS. 19 and 20 of the drawings represent schematic circuits of the alarm circuit by which to initiate an alarm warning signal in the event that the locking cable 4 is severed or jumped, or the top cover plate 14 is removed from housing 2 without properly operating lock assembly 18, or the housing 2 is vandalized by a thief seeking to disable lock/alarm 1 in order to remove the property protected thereby. It is to be understood that the numeric values listed for the electrical components of the circuit in FIG. 20 are for purposes of example and are not to be regarded as limitations of the invention. As is shown in FIG. 19, closing the microswitch 88 (by means of rotating the locking cam 82 of FIG. 18 into contact with switch arm 86 to thereby cause arm 86 to pivot into contact with microswitch 88) will connect the battery power supply 50 to the circuit 100 of FIG. 20, whereby a 9 volt source of positive supply voltage is available to energize said circuit.

The alarm circuit 100 of FIG. 20 includes a transistor driver 102 which comprises a plurality of parallel connected invertors 103, 104, 105 and 106 to buffer the output of driver 102. The input of driver 102 is connected to the output of a primary feedback oscillator 108 comprising an invertor 109. The output of driver 102 provides a buffered input signal to the control electrode of a transistor 110 which forms a transformer driver 111. The transistor 110 of driver 111 is connected to power the primary winding of a step-up transformer 112, whereby the 9 volt battery voltage can be increased to approximately 200 volts for driving the piezo electric transducer of horn 22 when a warning signal is to be emitted therefrom. Alarm circuit 100 also includes a secondary oscillator 114 comprising an invertor 115 having a feedback loop. Interconnected between the oscillators 108 and 114 is a transistor 116 which forms a coupling circuit 117, such that the frequency of oscillator 108 can be modulated by oscillator 114 via transistor 116.

Alarm circuit 100 also has a feedback network 120 which includes means responsive to the change in electrical resistance of a series circuit comprising the locking cable 4, the intrusion wire 92 (of FIGS. 13 and 14) which extends around the periphery of the housing 2 of lock/alarm 1, and the conductive strips 30 and 31 (of FIGS. 6a and 6b) which contact one another when the top cover plate 14 is properly secured to housing 2. For the purpose of illustration, wire 92 and strips 30 and 31 are shown diagrammatically as interlock switches. Feedback network 120 includes an enhancement mode field effect transistor 122 that is connected in a regenerative feedback path with a transistor 124 and is responsive to a rapid change in the electrical resistance of the aforementioned series circuit should said circuit be interrupted and an infinite resistance sensed. More particularly, such series circuit is connected between one conduction path electrode and the control electrode of transistor 122 and said transistor is thereby rendered non-conductive. However, if the locking cable 4 is severed, or the intrusion wire 92 is cut, or the cover plate 14 is improperly removed from the housing 2, such that said series circuit is interrupted, the transistor 122 will turn on to complete a current path to ground, whereby the horn 22 will be driven by battery 50 to emit a loud warning signal to indicate tampering with lock/alarm 1 and an impending theft of the property protected thereby.

In operation, the alarm circuit 100 of FIG. 20 is connected to and powered by the battery 50 of FIG. 19 when the lock assembly 16 is operated by the key 40, as was described when referring to FIGS. 16 and 17. Hence, a sense current is drawn by circuit 100 and supplied through the series connected locking cable 4, intrusion wire 92 and contact strips 30 and 31. Transistor 122 in feedback network 120 is rendered non-conductive so long as continuity exists between cable 4, wire 92 and strips 30 and 31. However, in the event that the locking cable 4 is severed, or the intrusion wire 92 is cut, or the strips 30 and 31 are separated from one another by a thief, the series circuit therebetween will be interrupted. Therefore, a relatively positive voltage will be applied from the battery 50 to an input control terminal 126 of transistor 122. Hence, transistor 122 will now be rendered conductive to complete a path from an electrical junction 128 to ground. Electrical junction 128 is interconnected with a conduction path electrode of transistor 122, a control electrode of feedback transistor 124, and input terminals of oscillators 108 and 114. Therefore, the primary oscillator 108 and the secondary oscillator 114 are caused to oscillate. Oscillator 114 oscillates at a substantially lower frequency (e.g. approximately 5 Hz) than the frequency (e.g. approximately 1 KHz) of oscillator 108 such that the frequency of oscillator 7 is modulated by oscillator 114 through transistor 116.

Moreover, the control electrode of feedback transistor 124 is connected near ground through electrical junction 128 and the conduction path of transistor 122, whereby transistor 124 is turned on and latched. With transistor 124 latched, a feedback path is established between transistors 122 and 124 through electrical junction 128, whereby transistor 122 remains conductive and the horn 22 remains energized even if tampering with the combination lock and alarm ceases and the vandalism is repaired. The horn 22 will sound continuously until alarm circuit 100 is de-energized by use of the key 40 to operate lock assembly 16. Alternatively, however, a timer (not shown) may be included in circuit 100 to limit the time during which the warning signal is sounded.

As an additional advantage of the present invention, alarm circuit 100 includes an impedance change detector 130 which comprises a high gain differential amplifier. Detector 130 applies trigger (TRG) and bias (BIAS) signals to the electrically conductive locking cable 4 to cause a pulsed current train to flow therethrough. If the cable 4 is jumped by a shunt wire such that the impedance of said cable changes, a differential voltage will be sensed by detector 130 at HI and LO terminals thereof which are interconnected at opposite ends of the cable. Accordingly, detector 130 is adapted to supply a positive voltage signal to the input control terminal 126 of transistor 122, whereby to turn said transistor on and thereby energize horn 22 to initiate the warning signal in the manner previously described.

Figure 21:
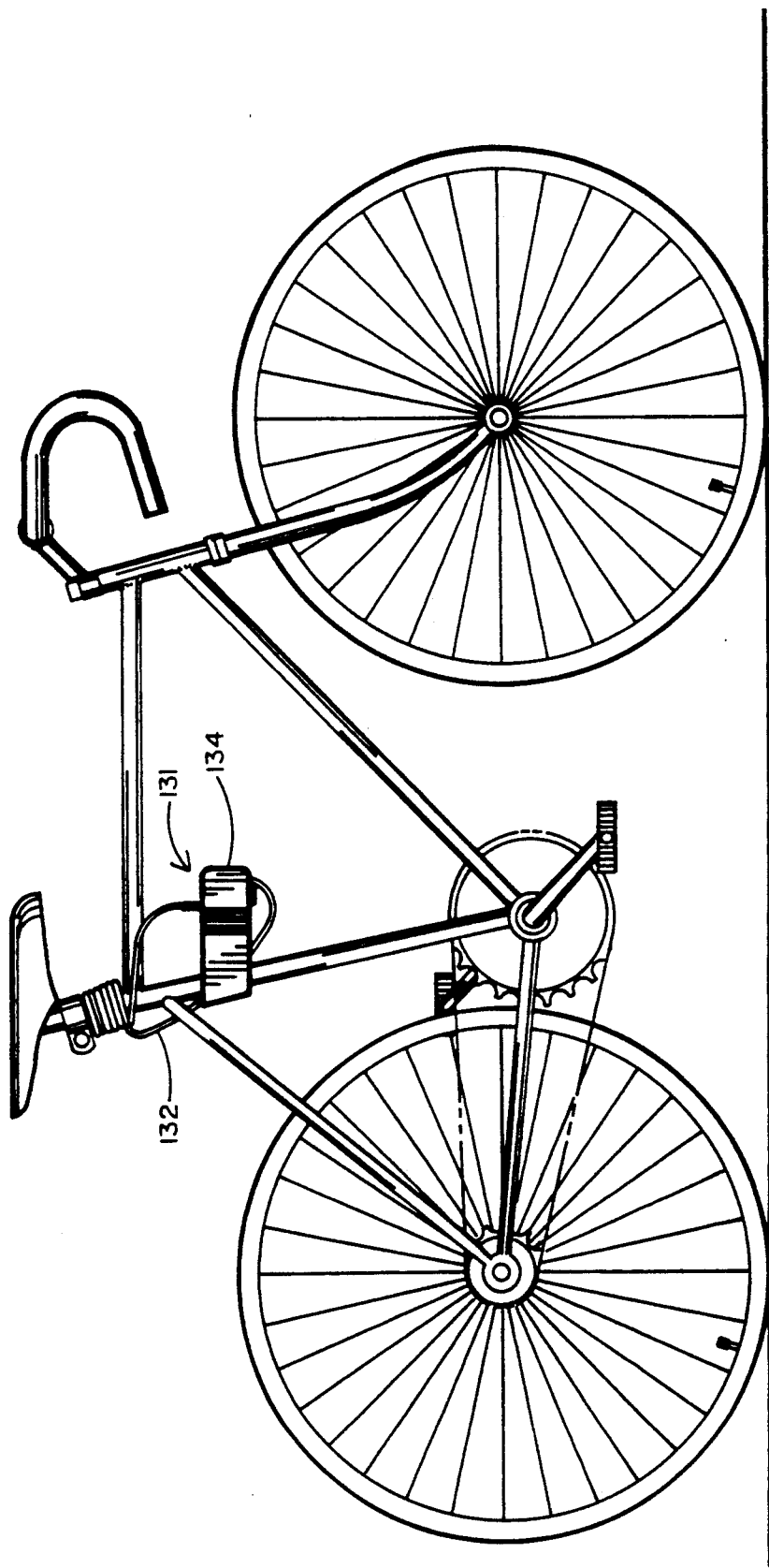
FIGS. 21 shows the combination lock and alarm according to a second embodiment of the invention attached to a bicycle.

FIG. 21 of the drawings shows a combination lock and alarm 131 which forms a second embodiment of the present invention. In the embodiment of FIG. 21, lock-/alarm 131 is interconnected with a movable object (e.g. a bicycle) which is to be restrained against theft or unauthorized use. Lock/alarm 131 includes an electrically conductive locking cable 132 and is similar to the combination lock and alarm 1 of FIGS. 1-20, except that lock/alarm 131 is attached to and carried by the object to be protected. What is more, the free end of cable 132 extends around an immovable object, such as a sign or a pole prior to the releasable connection of said free end to the housing 134. However, the alarm circuit within the housing 134 of lock/alarm 131 and the lock assemblies by which to energize the circuit and secure a detachable top cover plate 136 to housing 134 are identical to those previously described when referring to the lock/alarm 1 of FIGS. 1-20.

Figure 22:
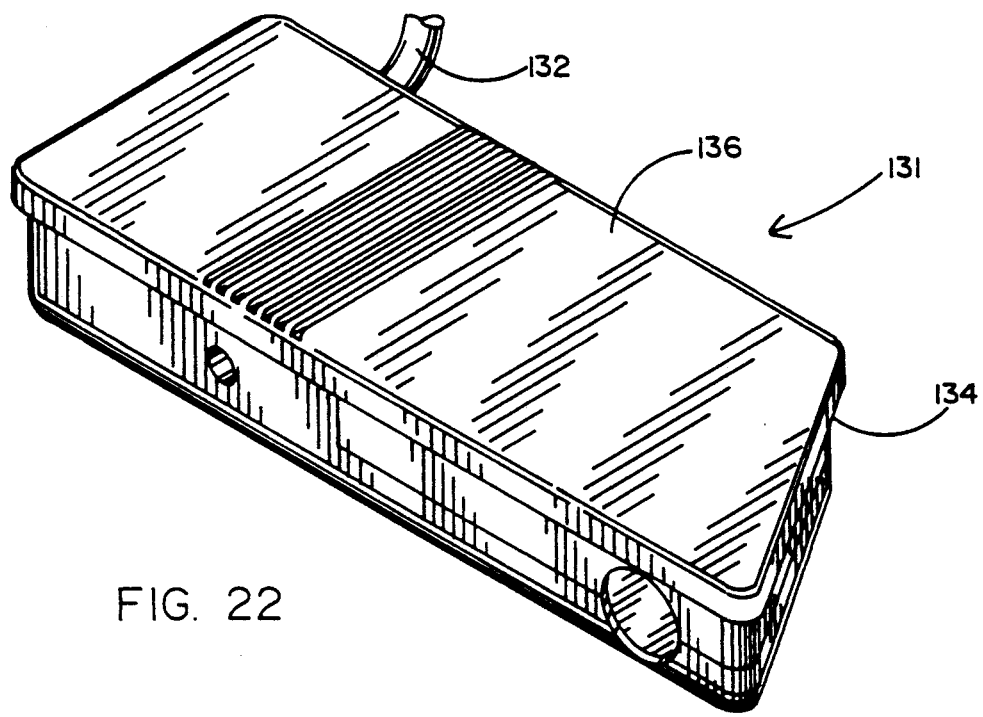
FIG. 22 is an enlarged perspective view of the combination lock and alarm of FIG. 21.
Figure 23:
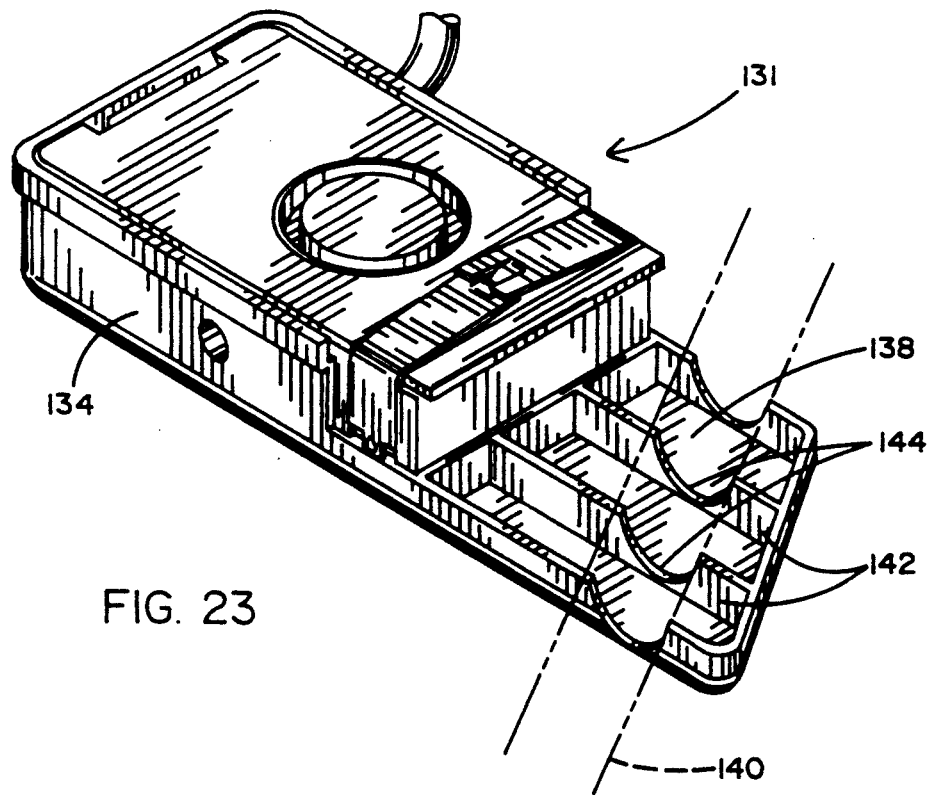
FIG. 23 shows the combination lock and alarm of FIG. 22 with a detachable cover plate removed therefrom.

In order to fasten the lock/alarm 131 to a bicycle, or the like, and referring now to FIGS. 22 and 23 of the drawings, the housing 134 is elongated to include beneath cover plate 136 a compartment 138 having a configuration which conforms to a bar (shown in phantom lines and represented by the reference number 140) from the frame of the bicycle. In the example shown in FIG. 23, compartment 130 comprises a series of parallel, spaced walls 142 extending upwardly therein and having respective arcuate-shaped cavities 144 within which to receive the generally cylindrical bar 140 of the bicycle. A series of similar walls (not shown) extends downwardly from top cover plate 136 in alignment with walls 142. Thus, with the cover plate 136 retained atop housing 134, as shown in FIG. 22, the bar 140 will be fixedly secured within compartment 138.

Accordingly, the combination lock and alarm 131 may be permanently and conveniently attached to and carried by the bicycle during periods of both use and non use. Access to the interior of housing 134 in an effort to separate bar 140 from compartment 138 can only be obtained by removing cover plate 136 by properly operating an associated lock assembly (corresponding to the assembly 18 of FIGS. 8-12). Any attempt to cut the cable 132 or vandalize the housing 134 to defeat the anti-theft features of lock/alarm 131 will cause a warning signal to be emitted to thereby indicate an impending theft in the same manner as has been previously disclosed.

It will be apparent that while a preferred embodiment of the invention has been shown and described, various modifications and changes may be made without departing from the true spirit and scope of the invention.

Having thus set forth a preferred embodiment of the invention, what is claimed is:

1. A combination lock and alarm to prevent theft or displacement of property to be protected, said combination comprising:
    a housing having a detachable cover;
    an alarm located within said housing to generate a warning signal;
    an electrically conductive cable having a first end fixedly connected within said housing and an opposite free end to extend around an immovable object and be removably retained within said housing;
    an alarm circuit located within said housing and adapted to activate said alarm if said cable is severed;
    a source of supply voltage located within said housing beneath said cover to power said alarm circuit;

a first lock assembly to releasably attached said cover to said housing to prevent unauthorized access to said source to supply voltage;

a rotatable second lock assembly to releasably retain the free end of said cable within said housing;

normally open switch means by which to electrically connect said source of supply voltage to said alarm circuit; and catch means rotated by said second lock assembly at the interior of said housing to engage the free end of said cable and close said switch means such that a rotation of said catch means simultaneously retains the free end of the cable within said housing and connects said source of voltage to said alarm circuit.

2. The combination recited in claim 1, wherein said switch means includes a normally open microswitch electrically connected between said source of supply voltage and said alarm circuit and a switch arm that is interconnected with said microswitch, said switch arm being positioned relative to said catch means such that a rotation of said second lock assembly causes a corresponding rotation of said catch means into engagement with said switch arm to move said switch arm and thereby close said microswitch between said voltage source and said alarm circuit.

3. The combination recited in claim 1, further comprising normally open contact means to be electrically connected between said voltage source and said alarm circuit, said contact means being positioned relative to said cover, such that the attachment of said cover to said housing causes said contact means to close to thereby provide power to said alarm circuit, and the detachment of said cover from said housing causes said contact means to open to thereby activate said alarm.

4. The combination recited in claim 3, wherein said normally open contact means includes at least one electrically conductive strip having a spring-like resiliency and being normally biased so as to move to an open condition and activate said alarm, said strip being positioned beneath and engaged by said cover when said cover is attached to said housing to cause said strip to move against its normal bias to a closed condition to provide power to said alarm circuit.

5. The combination recited in claim 1, wherein said cover includes a flange extending therefrom to be received against said housing when said cover is attached to said housing, said flange and said housing having respective axially aligned openings through which to receive said first lock assembly.

6. The combination recited in claim 5, wherein said first lock assembly includes a lock body that is rotatably received within the opening through the flange of said cover and a crossbar connected to and rotatable with said lock body, said crossbar located with respect to said housing such that a rotation of said lock body causes a corresponding rotation of said crossbar relative to the opening through said housing to prevent the removal of said crossbar and the detachment of said cover from said housing.

7. The combination recited in claim 1, further comprising key means by which to operate said first and second lock assemblies to thereby attach said cover to said housing and retain the free end of said cable within said housing, said key means having first and second ends, said first end operating said first lock assembly and said second end operating said second lock assembly.

8. The combination recited in claim 7, wherein said key means has a relatively narrow tail at the first end thereof and a relatively wide head at the second end thereof, said key means having a series of keyway slots formed in said narrow tail thereof by which to operate the second of said lock assemblies and at least two fingers projecting outwardly from said wide head thereof by which to operate the first of said lock assemblies.

9. The combination recited in claim 8, including removable cover means attached to and surrounding the relatively wide head of said key means, said at least two fingers connected to said cover means to operate the first of said lock assemblies.

10. The combination recited in claim 1, wherein said electrically conductive cable has a particular electrical resistance, said alarm circuit including means responsive to the resistance of said cable to cause said alarm to generate a warning signal in the event of a rapid change of such resistance due to a cutting of said cable or a jumping of said cable by a shunt conductor.

11. The combination recited in claim 1, wherein said alarm circuit includes an electrical conductor disposed around the inside periphery of said housing and means responsive to the resistance of said conductor to cause said alarm to generate a warning signal in the event of a rapid change of such resistance due to a cutting of said conductor during an intrusion and breaking into said housing.

12. The combination recited in claim 1, wherein said housing includes a generally hollow compartment located beneath the cover thereof and means within said compartment for receiving and engaging at least some of the property to be protected against theft.

13. A combination lock and alarm to prevent the theft or displacement of property to be protected, said combination comprising:

a housing having a detachable cover;

an electrical power source located within said housing beneath said cover;

an alarm located within said housing to generate a warning signal;

an electrically conductive cable having a first and fixedly connected within said housing and an opposite free and to extend around an immovable object and be removably restrained within said housing;

electrically conductive means extending around the periphery of said housing at the interior thereof; and an alarm circuit located within said housing to be connected to said power source to activate the alarm if said cable is cut, or said cover is detached from said housing, or said conductive means is severed when said housing is cut by one seeking unauthorized access to the protected property.

14. The combination recited in claim 13, wherein said alarm circuit also includes normally open contact means positioned relative to said cover such that the attachment of said cover to said housing causes said contact means to close and said alarm to be deactivated and the detachment of said cover from said housing causes said contact means to open and said alarm to be activated for generating the warning signal.

15. The combination recited in claim 13, wherein said alarm circuit also includes means for applying a current through said electrically conductive cable and responsive to the impedance of said cable, said alarm circuit activating said alarm if the impedance of said cable changes by more than a predetermined amount.

16. The combination recited in claim 13, further comprising:
- a first lock assembly to be operated to releasably attach said cover to said housing to prevent unauthorized access to said power source and said alarm circuit within said housing; and
- a second lock assembly to be operated to releasably restrain the free end of said cable at the interior of said housing, said second lock assembly having means by which to connect said alarm circuit to said power source at the same time that said free end is retrained.

17. The combination recited in claim 16, further comprising normally open switch means electrically connected between said power source and said alarm circuit,
- said second lock assembly including a rotatable lock body located at the interior of said housing for rotation therewithin and catch means carried by and rotatable with said lock body at the interior of said housing, such that a rotation of said lock body causes a corresponding rotation of said catch means into simultaneous engagement within the free end of said cable to restrain said free end and said switch means to close said switch means and thereby connect said alarm circuit to said power source.

18. A combination lock and alarm to prevent the theft or displacement of property to be protected, said combination comprising:
- a housing;
- an electrical power source located within said housing;
- an alarm located within said housing to generate a warning signal;
- an electrically conductive cable having a first end fixedly connected within said housing and an opposite free end to extend around an immovable object and be removably restrained within said housing;
- electrically conductive circuit means extending around the periphery of said housing at the interior thereof, said electrically conductive circuit means connected in an electrical series path with said electrically conductive cable; and
- an alarm circuit located within said housing to be connected to said power source to activate said alarm, said alarm circuit having means responsive to the resistance of said series path to cause said alarm to be activated in the event that either said cable or said conductive circuit means is severed and the resistance of said series path undergoes a rapid change.

19. The combination recited in claim 18, wherein said housing includes a cover detachably connected thereto above said power source, said combination further comprising normally open contact means connected in said electrical series path with said cable and said electrically conductive circuit means and positioned relative to said cover means, such that the attachment of said cover to said housing closes said contact means and completes said series path, and the removal of said cover opens said contact means and breaks said series path to cause the resistance of said series path to change and said alarm to be activated.

20. A combination lock and alarm to prevent theft or displacement of property to be protected, said combination comprising:
- a housing having a detachable cover;
- an alarm located within said housing to generate a warning signal;
- an electrically conductive cable having a first end fixedly connected within said housing and an opposite free end to extend around an immovable object and be removably retained within said housing;
- an alarm circuit located within said housing and adapted to activate said alarm if said cable is severed;
- a source of supply voltage located within said housing beneath said cover to power said alarm circuit;
- a first lock assembly to releasably attach said cover to said housing to prevent unauthorized access to said source of supply voltage;
- a second lock assembly to releasably retain the free end of said cable within said housing; and
- key means by which to operate said first and second lock assemblies to thereby attach said cover to said housing and retain the free end of said cable with said housing, said key means having first and second ends, said first end having a series of keyway slots for operating said first lock assembly and said second end having at least two fingers projecting outwardly therefrom for operating said second lock assembly.

* * * * *